(12) United States Patent
Brandelli

(10) Patent No.: US 9,260,848 B1
(45) Date of Patent: Feb. 16, 2016

(54) HYDRAULIC VALVE AND TOILET LEAK SAFETY CATCH

(71) Applicant: Anthony R. Brandelli, Lomita, CA (US)

(72) Inventor: Anthony R. Brandelli, Lomita, CA (US)

( * ) Notice: Subject to any disclaimer, the term of this patent is extended or adjusted under 35 U.S.C. 154(b) by 0 days.

(21) Appl. No.: 14/479,535

(22) Filed: Sep. 8, 2014

(51) Int. Cl.
*E03D 1/33* (2006.01)
*E03D 1/32* (2006.01)

(52) U.S. Cl.
CPC ... *E03D 1/32* (2013.01); *E03D 1/33* (2013.01)

(58) Field of Classification Search
CPC ....... E03D 1/32; E03D 1/33; Y10T 137/7413; Y10T 137/7433; Y10T 137/7426
USPC .......................... 137/430, 432; 4/415; 73/315
See application file for complete search history.

(56) References Cited

U.S. PATENT DOCUMENTS

| | | | |
|---|---|---|---|
| 265,709 A | 10/1882 | Sniffed | |
| 746,715 A | 12/1903 | Lindsay | |
| 2,841,169 A | 7/1958 | Martin | |
| 3,296,630 A | 1/1967 | Clark | |
| 4,094,327 A * | 6/1978 | Brandelli | 137/403 |
| 4,100,928 A | 7/1978 | Schoepe | |
| 4,182,364 A | 1/1980 | Antunez, Jr. et al. | |
| 4,562,859 A | 1/1986 | Shames | |
| 4,843,657 A | 7/1989 | Orr | |
| 4,901,377 A | 2/1990 | Weir | |
| 5,327,931 A | 7/1994 | Royalty et al. | |
| 5,551,466 A | 9/1996 | De Pieri | |
| 5,904,176 A | 5/1999 | Li | |
| 6,450,195 B1 | 9/2002 | Gil | |
| 6,510,866 B2 | 1/2003 | Li | |
| 6,712,090 B1 | 3/2004 | Brandelli | |
| 6,837,264 B1 | 1/2005 | Schuster | |
| 6,913,035 B2 | 7/2005 | Huang | |
| 8,132,273 B2 | 3/2012 | Bouchard | |

FOREIGN PATENT DOCUMENTS

GB        488402 A        7/1938

* cited by examiner

*Primary Examiner* — Mary McManmon
*Assistant Examiner* — Nicole Wentlandt
(74) *Attorney, Agent, or Firm* — Fulwider Patton LLP

(57) ABSTRACT

An elongated catch device pivotally mounted intermediately to an inlet pipe device and carrying at its upper extremity a keeper selectively disposed in the path of a float device to, unless a toilet has been flushed, block lowering of the float device and consequent opening of the control valve.

12 Claims, 12 Drawing Sheets

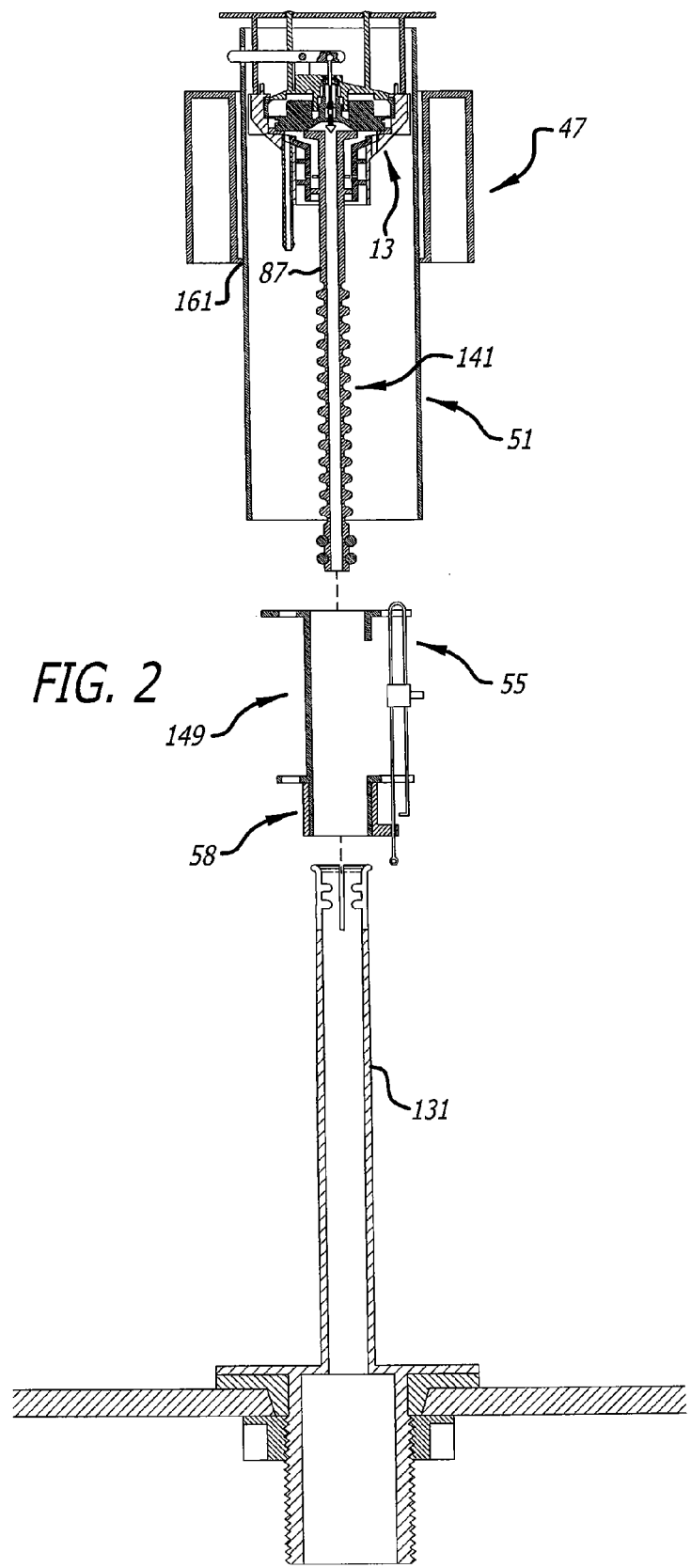

HYDRAULIC VALVE AND TOILET LEAK SAFETY CATCH

BACKGROUND

The present invention relates to hydraulic valves and more particularly to valves typically utilized to control fluid flow in a toilet tank and to a catch device to selectively control inflow from such valve.

DESCRIPTION OF THE PRIOR ART

Hydraulic valves have long been employed to control flow of liquid such as in a toilet tank. These valves often rely on buoyant floats for actuation to turn the incoming water off when the water reaches a predetermined level and to turn the water back on when a flush handle has been actuated to exhaust the fluid from the tank into the toilet bowl. An example of these types of valves and arrangements is shown my U.S. Pat. No. 6,712,090.

Many efforts have been made over the years to improve the construction of these valves, often referred to as ball cock valves and even to lock the valves against opening except when toilet has been flushed.

As disclosed in my prior U.S. Pat. No. 6,712,090, existing ball cock valves, in some instances, incorporate a valve body which sits on an upright supply pipe to control flow from the outlet at the top of the pipe via a flexible diaphragm which may be raised and lowered to open and close such outlet. It has been common practice for such diaphragms to incorporate a central vertical pilot passage which receives a vertically elongated pilot pin or stem having longitudinally spaced apart, diametrically enlarged cross sections spaced for selective registration with respective reduced-in diameter ports spaced along the length of the pilot passage for selectively blocking flow through the annulus formed between such enlarged cross sections and ports. When the enlarged sections are out of registration with the respective ports, water may flow upwardly through the pilot passage to pressurize the topside of the diaphragm to force it down into engagement with a seat formed at the pipe outlet to thereby block flow. A lever arm is pivotally mounted at one end to engage the pilot pin medially for raising and lowering of the pilot pin in response to raising and lowering of a donut shaped float mounted concentrically about the feed pipe to selectively control flow through the pilot passage.

While a significant improvement over the art at the time, this prior construction can sometimes suffer the shortcoming that stopping of flow through the pilot passage is dependent on registration of the enlarged sections with the respective ports and, over time, one or the other may be damaged or worn to the point where positive registration for control of flow is no longer effective. Further, the annuli between the pilot pin and ports in the passage provides for direct flow from the inlet pipe into the pilot passage and, with the relatively low volume of flow which can carry sediment, scum or residue, the annuli may become plugged or clogged.

Another example of a pilot valve construction for a ball cock assembly is a pilot pin carried from one end of a lever arm mounted pivotally to a pivot pin and projecting through an aperture in a seal element to be formed on its lower extremity with an enlarged bulbous portion apparently intended to be, when the valve is closed, engaged with the lower surface of the seal element to block flow there-through. A device of this type, while in theory providing for some degree of control for the seal to close off the water inlet, fails to provide for positive exhausting of fluid above the seal element in a manner which will result in positively releasing pressure above the seal element for raising thereof and, further, fails to provide for diverting the water during inlet flow in a positive manner to direct any sediment in such water away from the central underside of the seal element in a manner which will serve to minimize the tendency for such sediment to be directed into the pilot passage.

One commercially available ball cock valve is marketed under the mark FLUIDMASTER® and is well known in the field. Systems employing valves of this type, while popular in the marketplace, often incorporate a great number of parts, in some instances over 40, thus making them expensive to manufacture and requiring some degree of skill to assemble. Additionally, these commercially available valves do not typically incorporate any safety mechanism to stop flow of incoming water in the event of leakage from the tank.

As a result when, for one reason or another, water in the tank is drained from the tank as a result of malfunctions such as leakage from the water tank via a loose connection or a deteriorating flush valve thereby evacuating water from the tank causing the valve to open to allow for continuous inflow wasting water and creating a risk that the leakage may continue for an extended period of time.

In recognition of this problem, various efforts have been made to provide some type of lock for locking the control float against lowering to selectively lock the float against lowering to thereby prevent opening of the flow control valve to continuously introduce water.

In unrelated art, it has also been recognized that there may be a benefit to locking the valve control in its elevated position when repair work is to take place within the tank to thereby prevent continuous introduction of water during the repair process.

In this regard, it has been proposed to the incorporate a lock slidable on a float control arm to selectively lock the arm in its raised position to prevent actuation of the pilot valve. A lock of this type is shown in U.S. Pat. No. 6,837,264 to Schuster. While effective for locking the actuation arm in its raised position to prevent the ball cock valve from opening, such devices suffer the shortcoming that they require manual actuation thus failing to address the problem of continuous flow due to leakage which may take place over an extended period of time, as when the homeowner is on vacation or the toilet otherwise remains unattended.

In recognition of the need for a device to prevent inflow of water where there has been a leak unintentionally draining water from a toilet tank, it has been proposed to provide an auxiliary float to control a dog intended to engage a main float to restrict lowering thereof to prevent opening of a flow valve controlled by the main float unless draining of water from the tank was caused by a flush. It is believed that such a device was unduly complicated and has never achieved commercial success.

Further efforts prevent flow from the inlet pipe to replenish water which has leaked out, lead to a proposal that the float controlling the valve be blocked from lowering to selectively prevent actuation of a flow control valve. One such solution proposed an orthogonal catch device to be pivotally mounted to the lower portion of the fill pipe. The catch device includes an elongated vertical catch arm and a horizontal counterweight arm coupled with the flush lever. The catch arm is intended to be counterweighted to a vertical position underneath the float to block lowering of the float until such time as the free end of the counterweight arm has been raised by actuation of the flush lever to thereby rotate the mechanism to displace the top end of the catch arm from underneath the float to free the float to descend. A device of this type is shown in U.S. Pat. No. 4,843,657 to Orr.

While such devices might theoretically operate to block unwanted lowering of the float, it would appear that any commercial embodiment thereof would be somewhat expensive to manufacture and challenging to install and adjust to align the top end of the elongated vertical catch arm under floats of different diameters and configurations.

In further recognition of the need for a leak prevention mechanism, it has been proposed to provide a plurality of lever arms projecting outwardly and downwardly from the control valve and to manipulate control cams at the intersecting proximal ends to cooperate with the movement of a float for preventing unwanted leakage when the flush handle has not been actuated. A device of this type is shown in U.S. Pat. No. 8,132,273 to Bouchard. Such devices, while possibly helpful in preventing unwanted leakage, are particularly complicated, expensive to manufacture and would require a considerable amount of skill for successful installation.

Other efforts have included the proposal of a crank shaped wire latch device linked to the flush lever and having a section disposed under the actuation arm of a control valve such that actuation of the flush lever will release the control arm to initiate flow but, without actuation of the flush lever, will serve to block against opening of the control valve. A device of this type is shown in U.S. Pat. No. 5,327,931 to Royalty. Such devices, while appearing practical in theory, would be challenging to install and unreliable in operation.

SUMMARY OF THE INVENTION

In one aspect, the present invention includes an upright inlet pipe terminating at its upper extremity in a housing defining a chamber sitting over an inlet port for introduction of water. A flexible valve diaphragm is received in a chamber above the inlet port and includes a central, through pilot passage which receives a pilot pin disposed longitudinally in the passage and supported therein by enlarged portions engaged with respective ports spaced along the passage. The enlarged portions are formed with a peripheral fluted areas for escape of pilot control fluid. The pilot pin projects below the lower surface of the diaphragm and is formed with an enlarged poppet which, upon raising of the pin within the passage, serves to abut a seat formed on the underside of such diaphragm to close flow between the poppet and passage to thereby decrease the pressure on the top side of the diaphragm causing the water pressure on the underside to raise the diaphragm for flow of water from the inlet port outwardly into the toilet tank.

In another aspect, the invention incorporates an elongated catch device rotatably mounted on the inlet stand pipe of a fluid tank. The catch includes an upper extremity projecting upwardly adjacent a float device to normally dispose a keeper in the descending path of the float tube and wherein the opposite end of the catch device is linked to the flush handle for hinging of the catch device about an intermediate mount to selectively clear the keeper of such path when the flush handle is actuated.

BRIEF DESCRIPTION OF THE DRAWINGS

FIG. 1 A is a partial perspective view, in enlarged scale, of the upper portion of a control tube included in the catch device shown in FIG. 1 and depicting the control valve being installed;

FIG. 1 B is a perspective view similar to 1 A but showing the control valve fully installed;

FIG. 2 is an exploded, vertical, sectional view, in enlarged scale, of an inlet pipe device, control valve and catch device incorporated in the tank shown in FIG. 1;

DETAILED DESCRIPTION OF THE PREFERRED EMBODIMENTS

Figure 1:
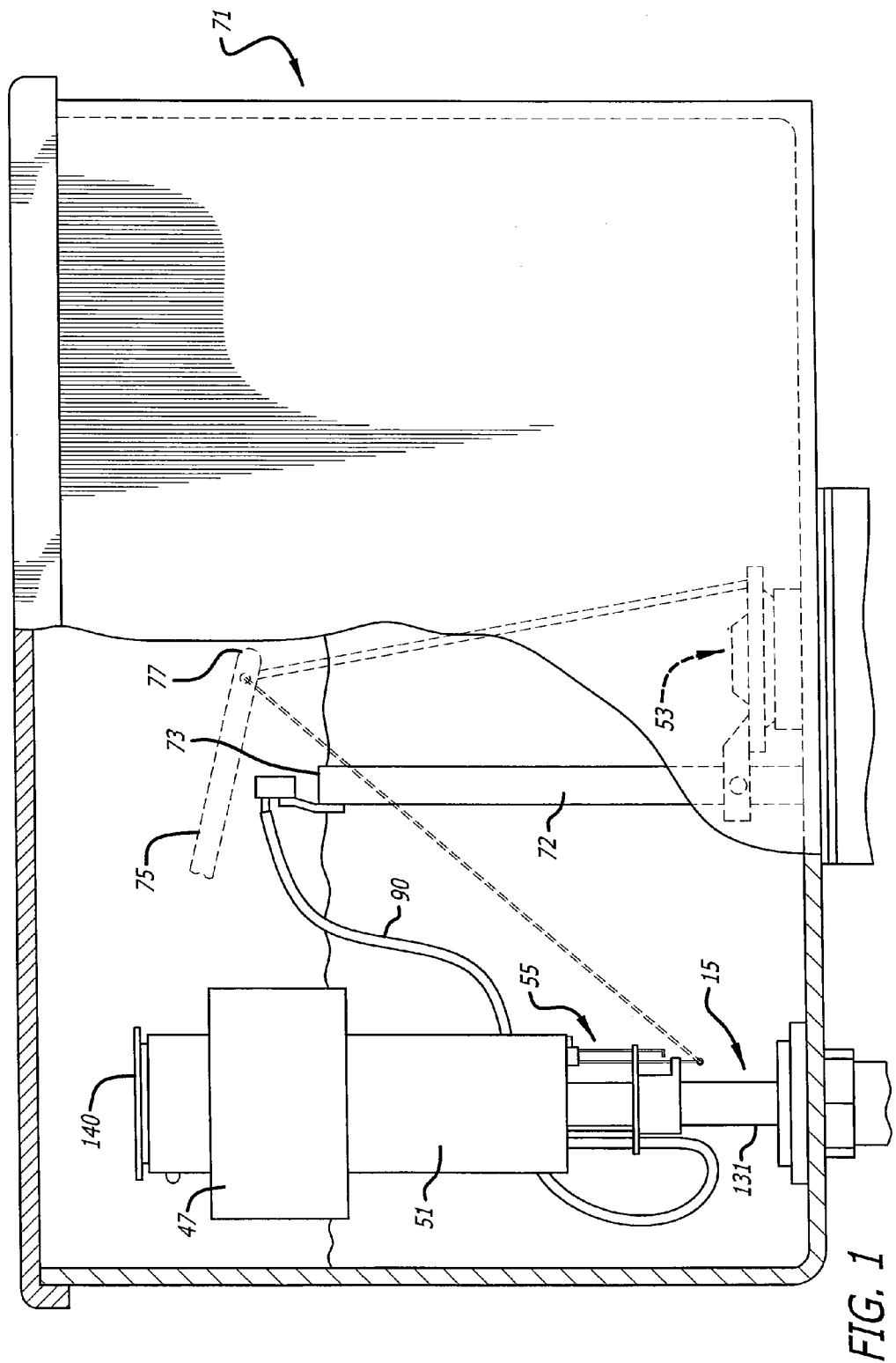
FIG. 1 is a front view, partially broken away, of a toilet storage tank which incorporates the improved flow control valve and flow stop catch device of the present invention.
Figure 1A:
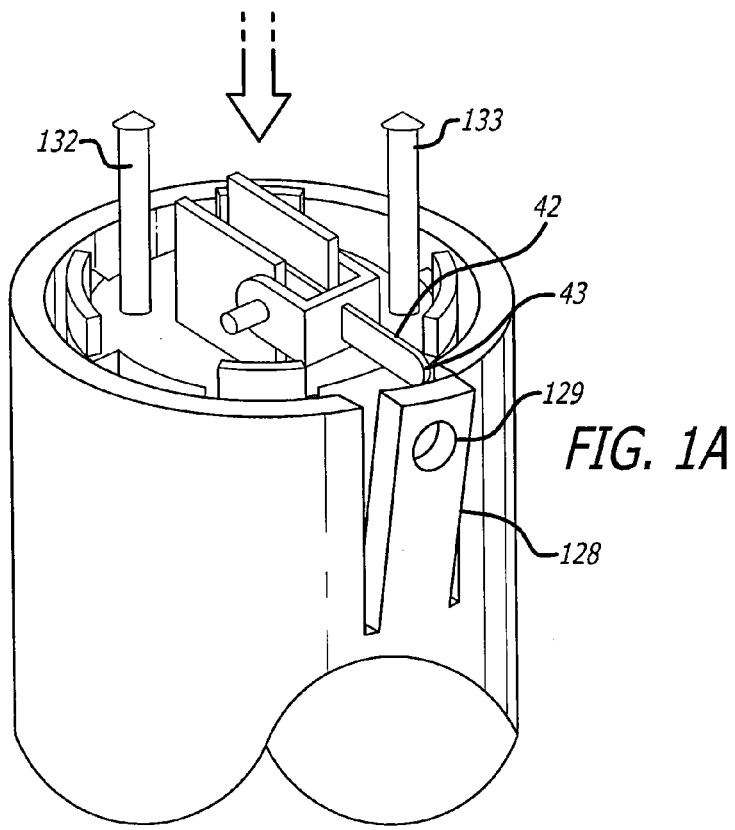
Figure 1B:
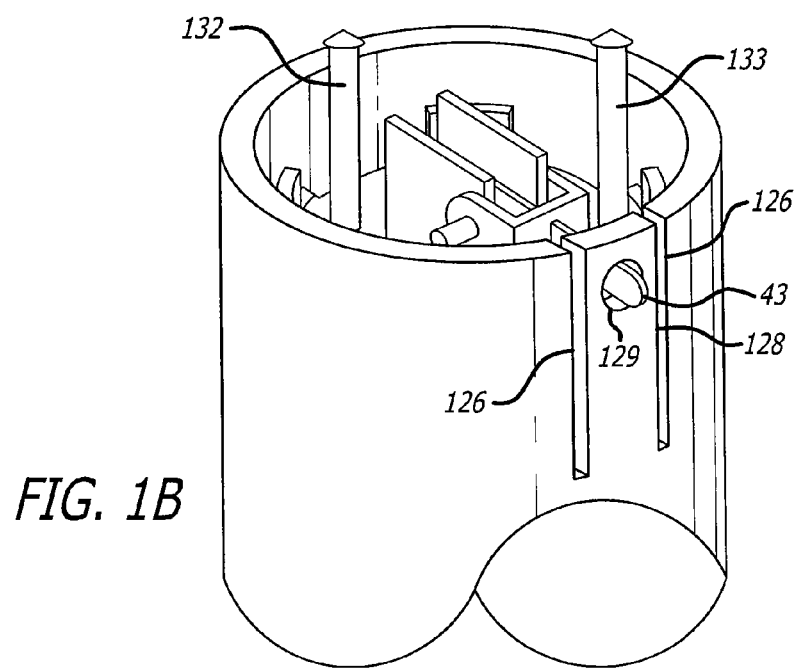

The control valve 13 of the present invention is intended for mounting on top of an upright inlet pipe device 15 which includes an outlet 17 surrounded by an upwardly facing valve seat 19 (FIGS. 6 and 7) against which a diaphragm 20 will seat when a pilot valve 23 is opened. The diaphragm 20 is formed with a central structure defining a pilot stem passage 26 having a pair of vertically spaced apart ports 27 and 29 with which respective enlarged portions 33 and 35 of a valve stem 37 are selectively registered. The passage terminates at its bottom end in an inlet port defining a downwardly facing pilot valve seat 28. The valve stem 37 projects downwardly below the port pilot seat 28 and is formed with an enlarged poppet 41 configured in its lower portion with downwardly facing upwardly and outwardly angled deflecting surfaces 60, (FIG. 7) to deflect upwardly flowing, incoming water to flow radially outwardly past the poppet. The stem 37 is controlled by a control lever 42 having a projecting extremity 43 controlled by a concentrically disposed cylindrical control tube 51 encircled by and carried by a donut shaped float 47.

Figure 7:
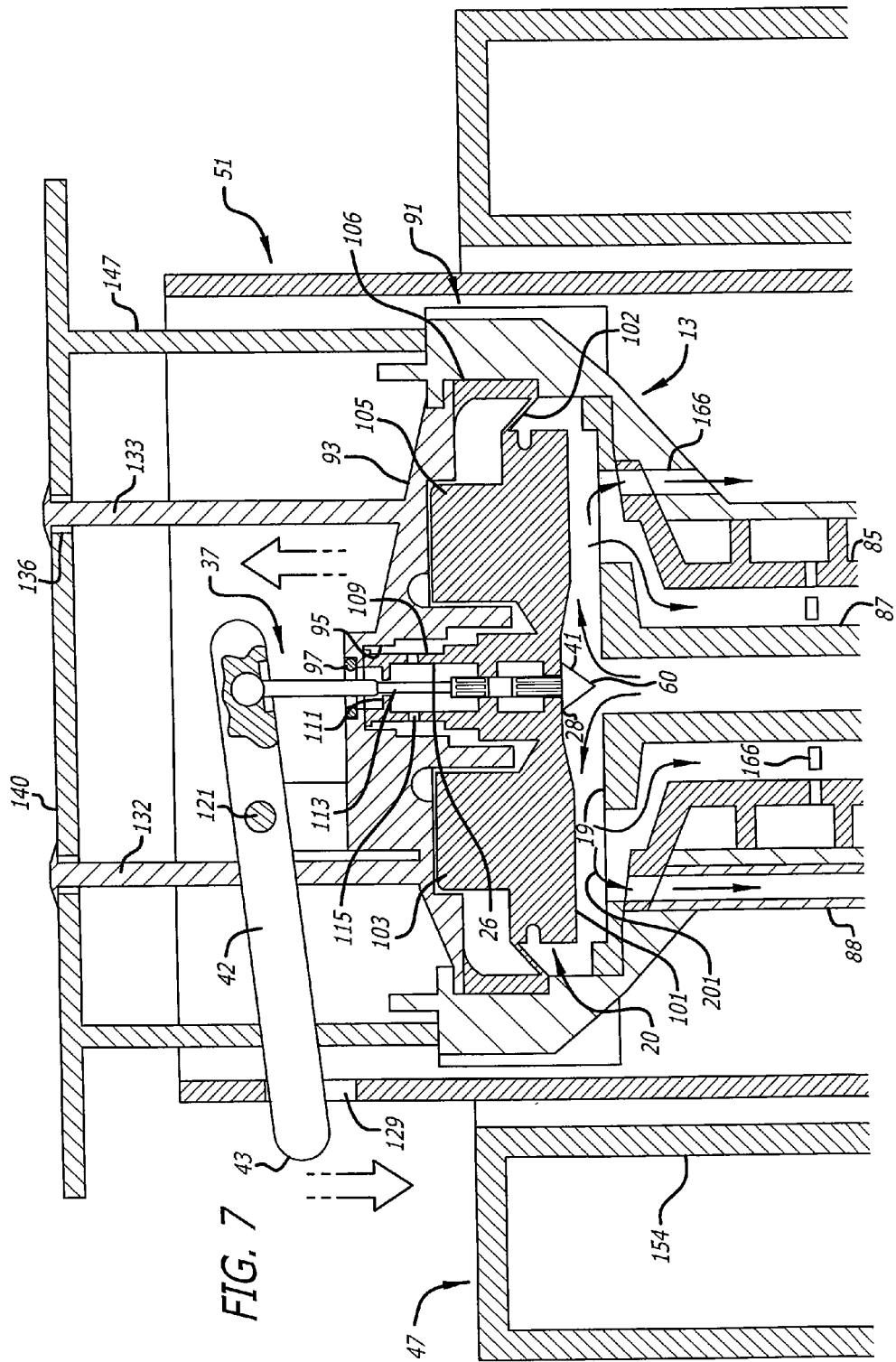
FIG. 7 is a vertical, sectional view similar to FIG. 6 but showing the flow control valve in its open position.

Thus, when the float 47 is lowered, the projecting extremity 43 of the lever arm 42 will be lowered thereby raising the pilot stem 37 to raise the poppet 41 to seat against the seat 28 on the underside of the diaphragm 20 (FIG. 7) to block flow of water upwardly through the passage 26 to thereby allow for pressurization of the underside of the diaphragm as shown in FIG. 7 to raise the diaphragm off its seat 19 thereby allowing flow of water up through the passage 87 defined by the upper extremity 87 of the pipe device to flow outwardly into the toilet tank and bowl as will be described below.

In another aspect of the present invention, lowering of the float may be selectively restricted to prevent the pilot valve 23 from opening the control valve 13. Referring to FIG. 1, control of the pilot valve 23 to control flow from the inlet pipe device 15 may be via the concentric control tube 51. The inlet pipe device is typically disposed spaced laterally from a flapper flush valve 53.

Figure 8:
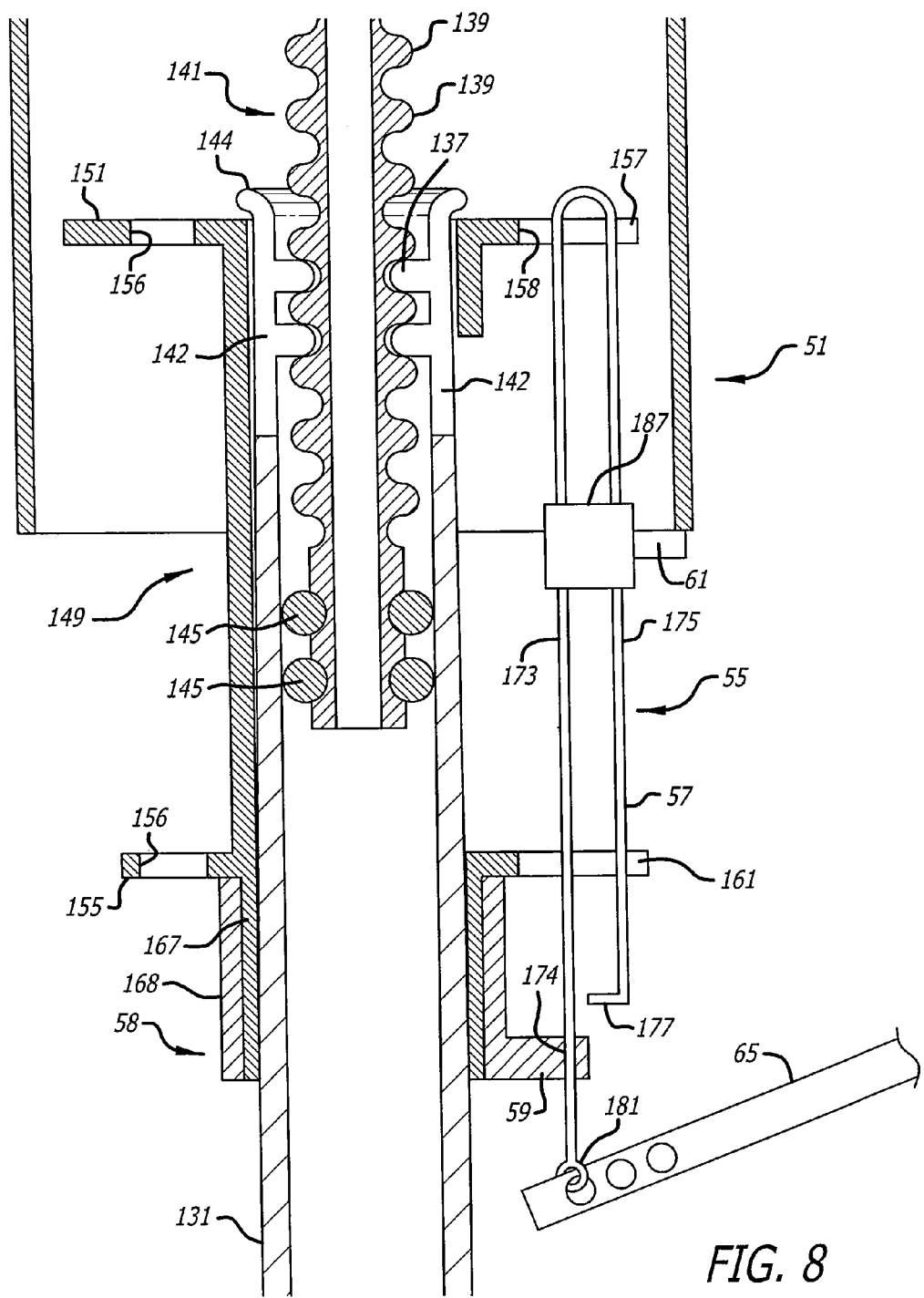
FIG. 8 is a vertical, sectional view, in enlarged scale, of the catch device shown in FIG. 3 and depicting the catch device blocking downward travel of a float tube device controlling the control valve shown in FIG. 7.

Referring to FIG. 8, a catch device, generally designated 55, is disposed on the side of the fill pipe facing the flush valve and, in the preferred embodiment, is formed by a generally hairpin shaped somewhat stiff but resilient spring wire 57 mounted medially from a mount device 58 which may include a radially projecting hinge arm 59 constructed of elastomeric material such as flexible rubber to provide for rocking or slight rotation of such catch device about the arm. Carried at the upper extremity of the catch device is a keeper 61 to be selectively disposed in the downward path of the control tube 51 to block the downward path thereof (FIG. 8). The lower extremity of the catch device 55 is connected with the flush control lever 75 by means of a link 65 such that, when the flush control lever is actuated, the catch device is rotated a few degrees counterclockwise on the hinge arm 59, as viewed in FIGS. 1 and 9, to move the keeper 61 to the left out from under the bottom edge of the control tube 51 thereby freeing the tube to lower as the water in the tank is lowered to thereby rotate the lever arm 42 counterclockwise as viewed in FIG. 7 to open the flow control valve 13. Concurrently, the lever arm will lift the free side of the flapper valve 53 to flush the water from the tank into the bowl.

Figure 6:
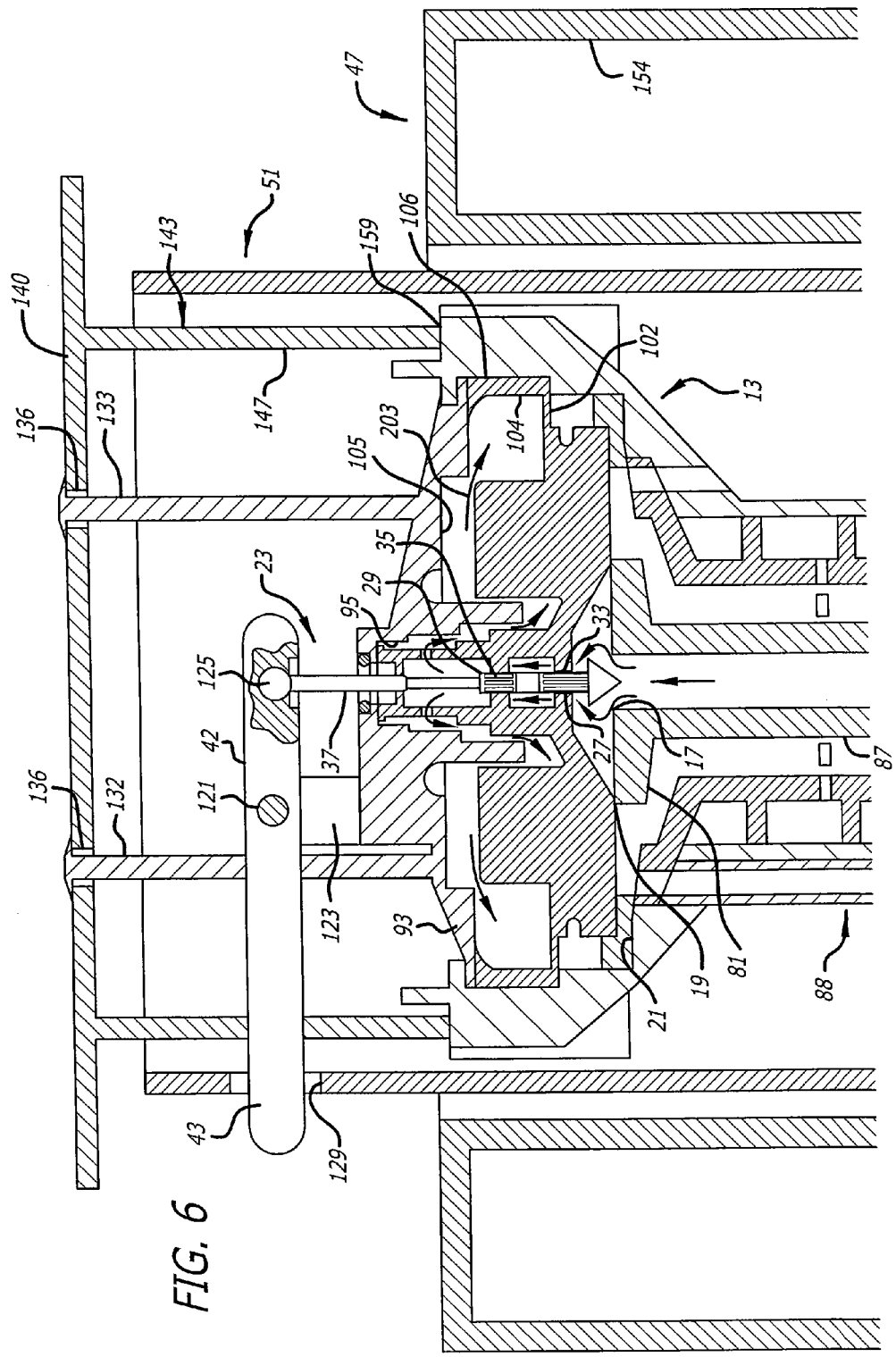
FIG. 6 is a partial vertical sectional view, in enlarged scale, of the flow control valve shown in FIG. 4 and depicting the valve in its closed position.

On the other hand, should the water level in the tank 71 be lowered, by a leak, from the level shown in FIG. 1 without actuation of the flush lever, the keeper 61 will remain positioned in the path of the control tube 51 (FIG. 8) to prevent lowering thereof to retain the pilot valve 23 open and the flow control valve closed (FIG. 6).

Referring to FIGS. 1 A and 1 B, the control tube 51 may be constructed of plastic and the upper extremity thereof formed at one diametrical side with a pair of annularly spaced apart, longitudinal slits 126 defining there-between a narrow, upwardly projecting resilient tongue 128 formed at its free extremity with the bore 129. In this manner, when the control valve is installed, the distal extremity 43 of lever arm 42 will ride downwardly on the inner surface of the free extremity of the tongue 128 to drive the free end radially outwardly, as it is viewed in FIG. 1 A, until the bore 129 is registered with the lever arm for projection into such bore as shown in FIG. 1 B allowing the tongue to snap back into its neutral position.

Toilet tanks 71 typically incorporate an upstanding inlet pipe and an upstanding overflow pipe 72 (FIG. 1). The overflow pipe is formed on its top end 73 for when the water reaches a certain level, allow escape of the water thereby preventing overflow of the water from the tank. Overflow pipes of the type of the pipe 72 typically incorporate a network of water channels leading to the toilet bowl for replenishing bowl water after a flush.

With continued reference to FIG. 1, such toilet tanks also typically incorporate an actuation knob or lever which might actuate a flush lever 75 to rotate a free end 77 between a lowered fill position and a raised flush position.

Referring to FIGS. 6 and 7, the inlet pipe device 15 includes a lower pipe 131 typically connected through the bottom wall of the tank 71 and an upper pipe 141 telescoped downwardly therein. The pipe 141 is formed on its upper extremity 87 with a radially enlarged flange 81 constructed with an upwardly facing annular surface defining the control valve seat 19.

The control valve device 13 includes a tubular housing, generally designated 91, formed on its periphery with longitudinal guide ribs spaced equidistant annularly around the housing to provide a generally annular siphon break space between the housing and the control tube 51. The lower portion of the housing is configured in part, by an interior annular flange and an exterior connector flange 21 (FIG. 6). The housing is further formed with an annular top wall 93 (FIG. 6). The top wall is formed centrally with a downwardly projecting cylindrical shell defining a central, stepped, vertical bore 95 which, in the upward direction, progressively reduces in diameter to terminate at its upper extremity in an upwardly opening O-ring gland for receipt of an O-ring 97 (FIG. 7).

The diaphragm is then formed centrally with a upstanding, stepped tower 109 received complimentary in the stepped bore 95 and configured centrally with the pilot passage 26. The tower is further configured at the upper extremity with an annular flange 111 receiving a reduced-in-diameter neck 113 of the stem.

The tower 109 is formed with a plurality of radially, outwardly opening bleed passages 115 for selectively bleeding fluid from the pilot passage 26 when the pilot valve is open.

In the preferred embodiment, the lever arm 42 is pivotally mounted on a pivot pin 121 carried from a yoke 123 standing up from the top side of the housing 93. Referring to FIG. 6, the right hand end of the lever arm includes a ball socket couple with a ball 125 formed at the upper extremity of the stem 37.

Figure 4:
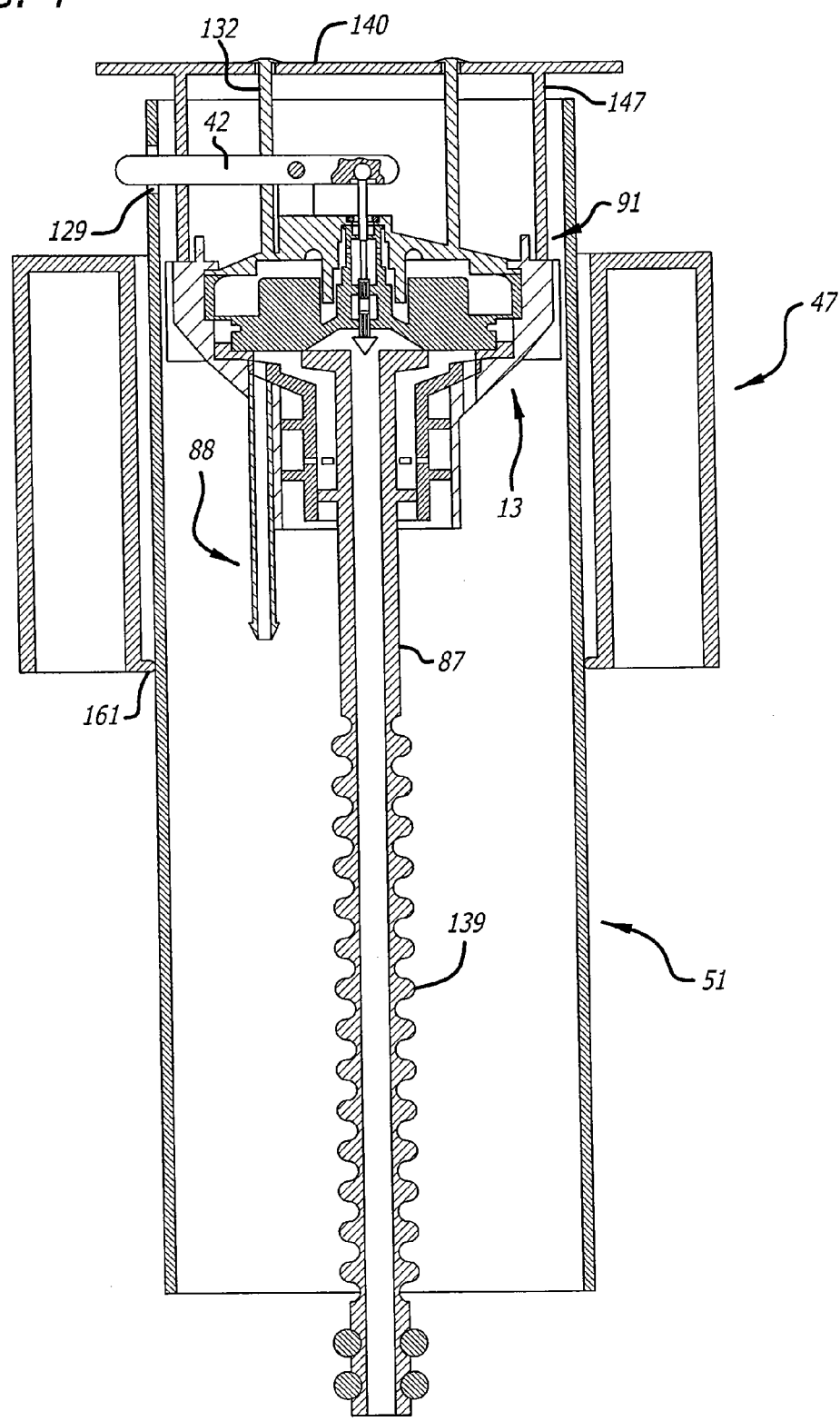
FIG. 4 is a vertical, sectional view in enlarged scale, of the upper portion of the flow control valve shown in FIG. 3.

Referring to FIGS. 4, 6 and 7, a pair of posts 132 and 133 stand up from the top of the housing 93 and project through spaced apart bores 136 in a top wall 140 of a cap 143 having an annular, downwardly projecting skirt 147 sitting on an annular flange 159 formed about the periphery of the valve housing.

As noted above, in one preferred embodiment, a donut shaped buoyant float 47 is telescoped over the control tube. The float is configured with an annular air chamber 154 and is formed on its interior diameter with one or more friction devices such a rib 161 (FIG. 3) to form an interference fit with the exterior wall of the control tube 51 to releasably hold the float in position along the vertical length of such tube.

Figure 3:
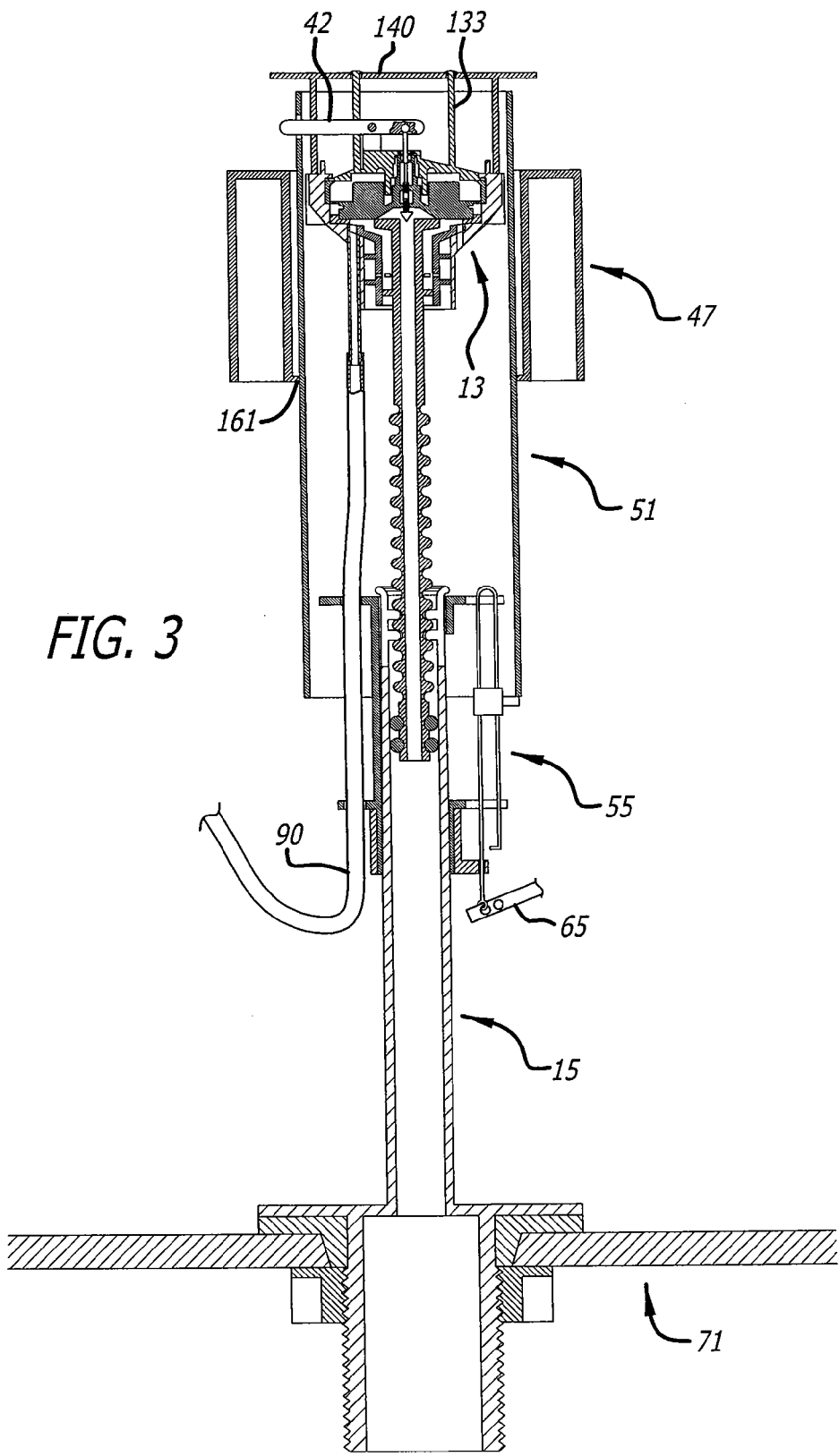
FIG. 3 is a vertical, sectional view similar to FIG. 2 but in enlarged scale and the components assembled.

Referring to FIGS. 1, 3 and 4 the valve housing is conveniently formed with a downwardly depending nipple 88 which is connected on its lower extremity with a fill tube 90 leading to the top end of the overflow pipe 72 for filling the bowl.

The diaphragm 20 is typically constructed of elastomeric material and includes a central body having a downwardly facing sealing surface 101 (FIG. 7) to seat against the seat 19. The diaphragm is concentrically formed about its periphery with an annular, flexible web 102 carrying the body from an anchor ring 104 trapped in an annular channel 106 formed between the top and bottom walls of the housing. The body incorporates a upwardly projecting, concentric rim 103 received in an annular clearance groove 105 formed in the underside of the top wall 93.

It will be appreciated by those skilled in the art that the poppet 41 is enlarged in diameter and is preferably formed on its bottom side with upwardly and outwardly angled deflecting surfaces 60 to deflect upwardly flowing water radially outwardly to then flow back radially inwardly under the seat 28 and upwardly into the annulus formed in the passage 26.

Figure 5:
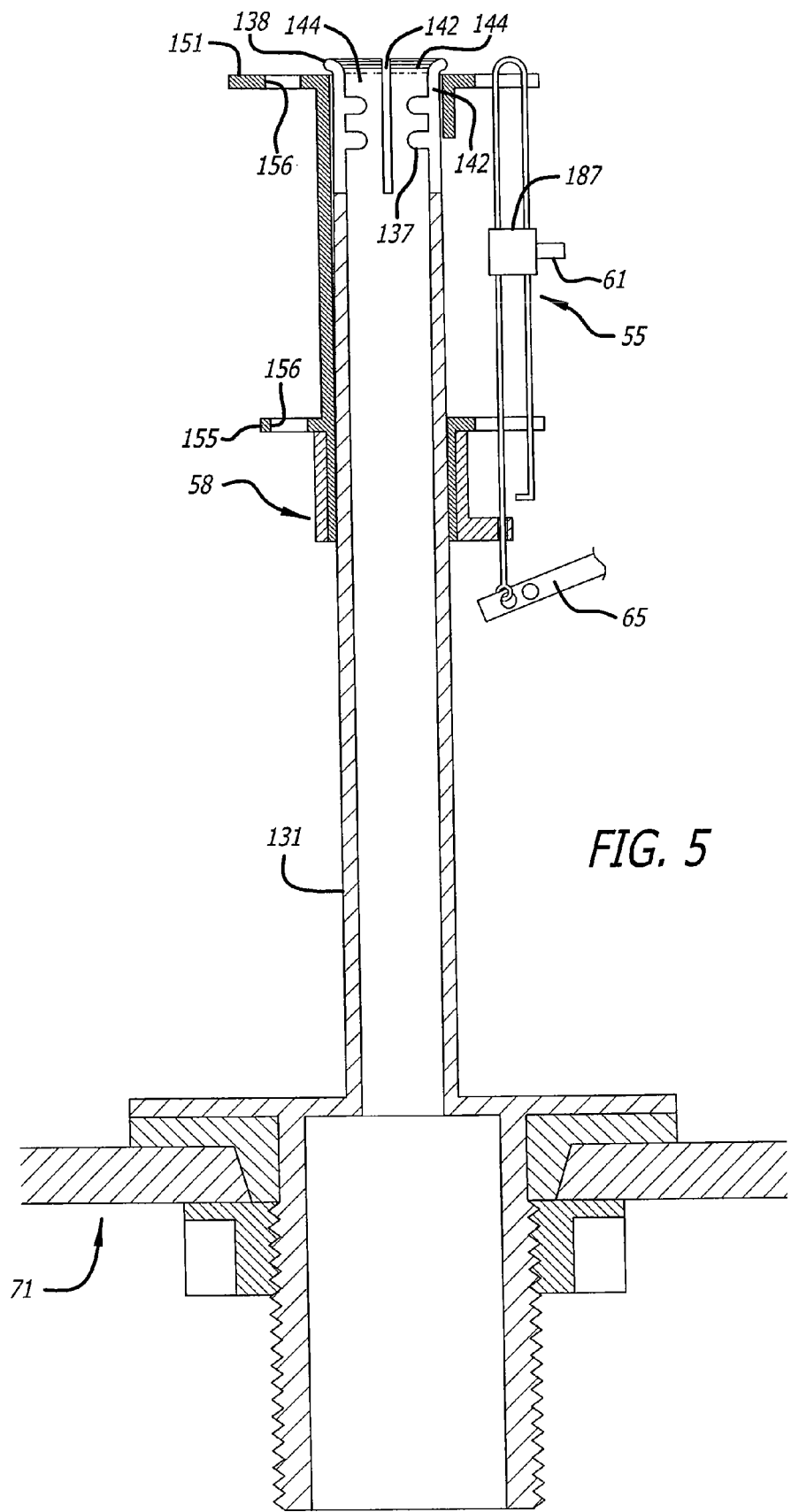
FIG. 5 is a vertical, sectional view, in enlarged scale, of the lower portion of the inlet pipe device and catch device shown in FIGS. 2 & 3.

Turning now back to FIGS. 5 and 8, the fill pipe device 15 includes upper and lower pipes 141 and 131 respectively. The lower fill pipe 131 is configured in its upper extremity with a pair of interior annular ribs 137 formed to receive in overlapping radial relationship corresponding pairs of annular ribs 139 spaced along the exterior of the upper pipe 141. The upper pipe is telescoped the desired distance downwardly into the lower pipe for selective registration of the ribs 137 in respective grooves formed between the ribs 139 on the upper tube 141.

Figure 10:
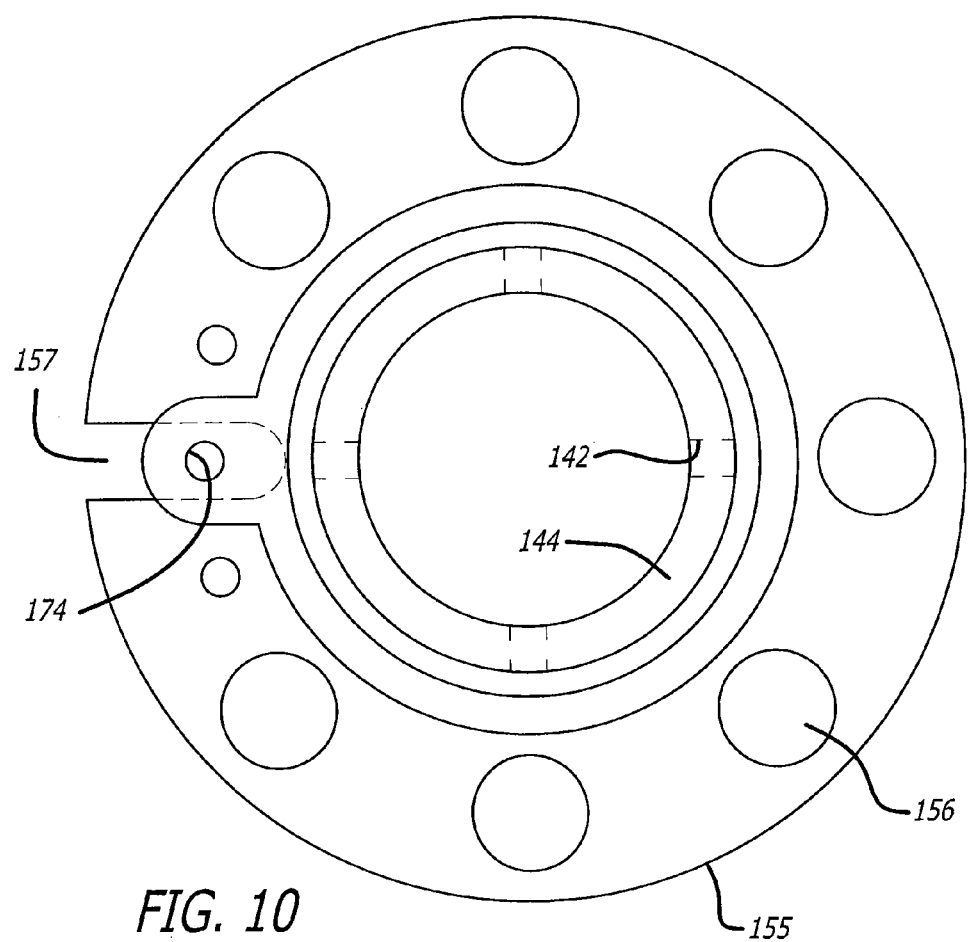
FIG. 10 is a transverse, sectional view, in enlarged scale, of a locking flange incorporated in the catch mechanism shown in FIG. 9.

Referring to FIGS. 8 and 10, the upper extremity of the lower pipe 131 is configured with four longitudinal, upwardly opening slots 142 spaced equidistant about the periphery to form four resilient, upstanding, cantilevered fingers 144 disposed in respective quadrants. As will be appreciated, each finger is formed at its upper extremity with a respective segment of the radially, inwardly projecting ribs 137. Consequently, I provide a snap in feature facilitated by outwardly flared flange segments defining respective lips 138 at the upper extremities of the fingers having, when the fingers are in their relaxed position, a combined maximum outside diameter larger than the inside diameter at the top of the fitting flange 149.

Formed in the lower extremity of the upper pipe 141 are a pair of O-ring grooves for receipt of O-rings 145 for sealing against the interior of the lower pipe 131.

With continued reference to FIG. 8, a spool shaped lock fitting, generally designated 149, is received in telescopical relationship over the upper extremity of the lower pipe 131 and is formed with upper and lower radial flanges 151 and 155.

As mentioned, in one preferred embodiment, the fitting 149 is formed with an upwardly narrowing tapered interior diameter sized to, to be dropped down over the upper extremity of the lower pipe 131 during assembly. This serves to compress the upper ends of the fingers 144 in each quadrant radially inwardly to a degree where the rib segments 137 will be diminished in their respective combined diameters to register in respective, selected grooves formed between the ribs 139 to lock the fill pipe device at the desired height. The fitting will thus be dropped down to the level where the lip segments will be disposed above the top of the fitting 149 to thus block the fitting from shifting upwardly as, for instance, under the force of the link 65 being drawn upwardly to the right during flush (FIG. 5).

The flanges 151 and 155 (FIGS. 8 and 10) are configured with a plurality of through, vertical bores 156, respectively, spaced equidistant thereabout for receipt of the tube 90. The flanges are further formed on their respective one sides with diametrical, outwardly opening clearance slots 157 for receipt of the catch device 55 and to act as a radial guide. The closed end of the slot in the upper flange acts as a stop 158 to limit counter clockwise rotation of the catch device.

With continued reference to FIG. 8, conveniently, the fitting 149 is further formed below the flange 155 with a downwardly projecting annular skirt 167. The mount device 58 is conveniently formed with an elastomeric ring 168 to be telescoped over the skirt 167 and is formed in its lower extremity with the radially, outwardly projecting, flexible hinge arm 59. The hinge arm 59 is formed with a through vertical bore 174 for frictional receipt of one leg 173 of the catch device 55. The other leg 175 of the catch device 55 is constructed of spring wire to project parallel to the leg 173 to cooperate in mounting the slider 187. The leg 175 is formed at its lower extremity with a orthogonal tab 177 which, in the preferred embodiment, is turned radially inwardly toward the first leg 173 to terminate in an end spaced therefrom. In some embodiments, the tab 177 is turned radially outwardly so that the catch device can be mounted via that tab. As will be apparent to those skilled in the art, some embodiments do not include such a tab 177. A U-shaped slider 187, formed with bores and maintaining the keeper 61, may be telescoped over the parallel legs 173 and 175.

In the preferred embodiment, the leg 173 projects below the hinge arm 59 to define a lever arm formed with an eye 181 connected with the link 65. As will be appreciated by those skilled in the art, the link 65 may take many different forms such as a chain, rigid link, coil spring or even an elastomeric strip.

The slider 187 is configured with a pair of horizontally spaced apart vertical bores into which spring wire legs 173 and 175 are friction fit for slidable adjustment of the slider 187 to the desired elevation on the catch device. As will be appreciated, such bores may merely be in the form of a single transverse, through slot, vertically receiving such legs at the opposite sides thereof.

In operation, it will be appreciated that the device of the present invention can easily be installed in a conventional toilet tank 71 and the vertical adjustment made for the vertical profile of the tank and desired water level. Hence, when the water valve under the tank is opened, the water will flow upwardly through the inlet pipe device 15 through the upper tube 87 to pressurize under the diaphragm as shown in FIG. 7 thereby raising the diaphragm off its seat 19 and allowing water to flow upwardly and radially outwardly under the diaphragm as indicated by the directional arrows 201 (FIG. 7) to flow downwardly through the passages 166 into the tank 71 thereby commencing filling of such tank water will also flow downwardly through the nipple 88 through the tube 90 to the overflow pipe 72 to fill the toilet bowl. As the water level in the tank raises, the float 47 will be raised causing it to raise the control tube 51 thereby raising the free end 43 of the control lever arm 42 as shown in FIG. 6 to rotate such lever arm clockwise about its pivot pin 121 to drive the stem 37 downwardly. This will then lower the poppet 41 downwardly from its seat 28 to enable flow about such poppet and upwardly through the fluted grooves in the enlarged sections 33 and 35 and upwardly in the tower to flow radially inwardly through the bleed ports 115 to flow downwardly in the tower and radially outwardly above the top of the diaphragm 20 as indicated by the directional arrows 203 (FIG. 6) to pressurize the top side of such diaphragm driving it downwardly to seat on the seat 19 and block further escape of incoming water from the upper tube 87 thereby serving to maintain the water in the tank 71 at the desired level.

Figure 9:
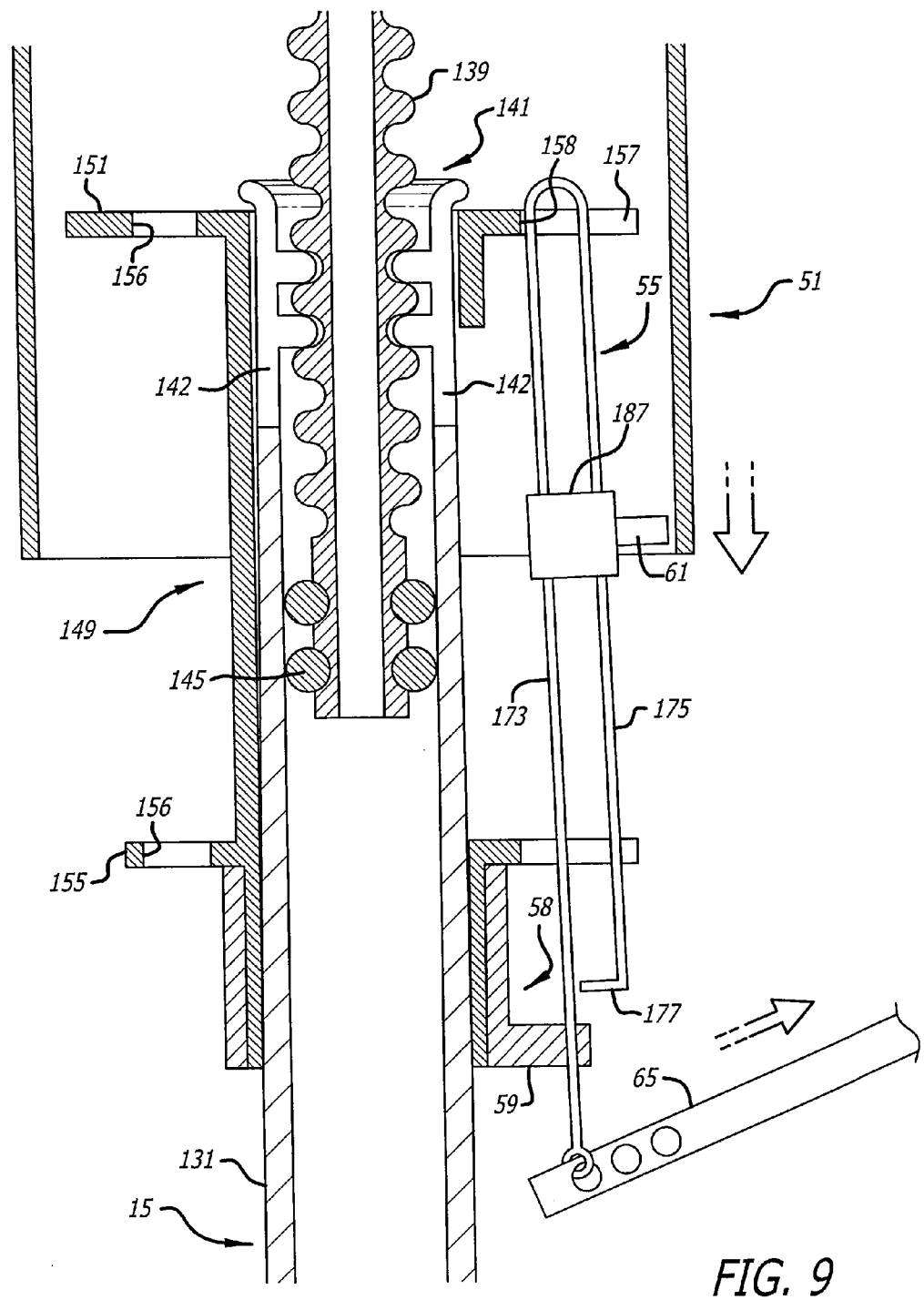
FIG. 9 is a vertical, sectional view, similar to FIG. 8 but showing the catch devices released.

Concurrently, as the control tube 51 is raised by elevation of the float 47 the bottom edge thereof will clear the elevation of the keeper 61 allowing the bias of the hinge arm 59 to rotate the catch device 55 clockwise about such hinge arm, as viewed in FIGS. 8 and 9, to drive the keeper 61 radially outwardly under the wall of the tube 51 to block the downward path of such tube until such time as the toilet is flushed again.

As will be appreciated by those skilled in the art, water in the tank 71 will thus remain at the desired level prepared for the next flush. In the event, however, that the water should accidentally leak from the tank, as by a loose or failing connection or crack in the tank, it will be appreciated that as the water level lowers in the tank without actuation of the flush control lever (not shown), the catch 55 will remain in the catch position shown in FIG. 8, thus blocking the control tube 51 from lowering below the position shown. This then serves to prevent such control tube from lowering the free extremity 43 of the lever arm 42 (FIG. 6) thus leaving the valve poppet off its seat and the top side of the diaphragm 20 pressurized to maintain the diaphragm on its seat 19 to block inflow of water from the upper inlet tube 87.

Consequently, the total loss of water will equal only that which is stored in the tank 71 and inflow of additional water from the upper inlet tube 87 will be blocked until such time as the homeowner or attendant note that the tank 71 has been evacuated without refill. This then alerts the homeowner of the leak and will allow for repair work before the tank 71 is again filled with water.

With continued reference to FIG. 7, it will thus be appreciated that water flowing upwardly from the upper inlet tube 87 it will strike the facing conical poppet 41 and be diverted radially, outwardly, and downwardly as indicated by directional arrows 201 to the outlets 166 to be defined by annular deflectors 85.

The incoming water will be directed to flow outwardly around the conical poppet to flow upwardly in the passage 26, through the annuli formed with the respective ports 27 and 29, via the grooves in the flutes of the enlarged sections 33 and 35 (FIG. 6). Flow will continue on upwardly in the tower to flow outwardly in the bleed ports 115 (FIG. 7) to maintain a positive pressure differential acting down on the top of the diaphragm 20. The control valve will thus remain closed until such time as the float and control tube are lowered as by a toilet flush. It will be appreciated that as the float carries the control tube 51 up, the lower edge of such tube will be raised above the level of the keeper 61 to free the catch to be rotated clockwise under the influence of the elastomeric hinge arm 59 to the position shown in FIG. 8 disposed under the bottom edge of such tube.

Then, when the flush handle is operated to flush the toilet, the outlet valve 53 (FIG. 1) will be opened and the link 65 drawn to the right as viewed in FIG. 9 to rotate the catch device 55 counter clockwise about the point defined by the hinge arm 59 to drive the upper end of the catch device 55 to the left to strike the stop 158 as the keeper 61 is likewise shifted to the left from under the edge of the tube 51 freeing such tube to lower. This then serves to lower the free end 43 of the lever 42 (FIG. 7) to raise the poppet 41 to discontinue bleed of fluid up the passage 26 and pressurize the underside of the diaphragm to raise such diaphragm off its seat. This then allows for pressurized water to flow out of the upper inlet tube 87 to flow radially outwardly and down through the ports 166 as depicted by the directional arrows (FIG. 7) to again fill the tank.

As will be appreciated by those of skill, for different types of water tanks 71, such as the ever-popular low profile tanks, the vertical adjustment of the inlet pipe device 15 will be made to establish the desired level of water in the tank. Thus, for a low profile tank, the upper inlet pipe 141 may easily be telescoped downwardly into the lower pipe 131 as the ribs 139 flexibly pass the ribs 137 until the desired height of the inlet device is established thereby positioning the float 47 at the desired level for causing the control tube 51 to actuate the control lever 42 at the desired water level.

In that regard, it will be appreciated that when the inlet pipe device is telescoped down, it is possible to slide the slider 187 down a corresponding amount on the catch device 55 to thus coordinate actuation of and blocking in accordance with the desired height of the water in the tank 71.

Figure 11:
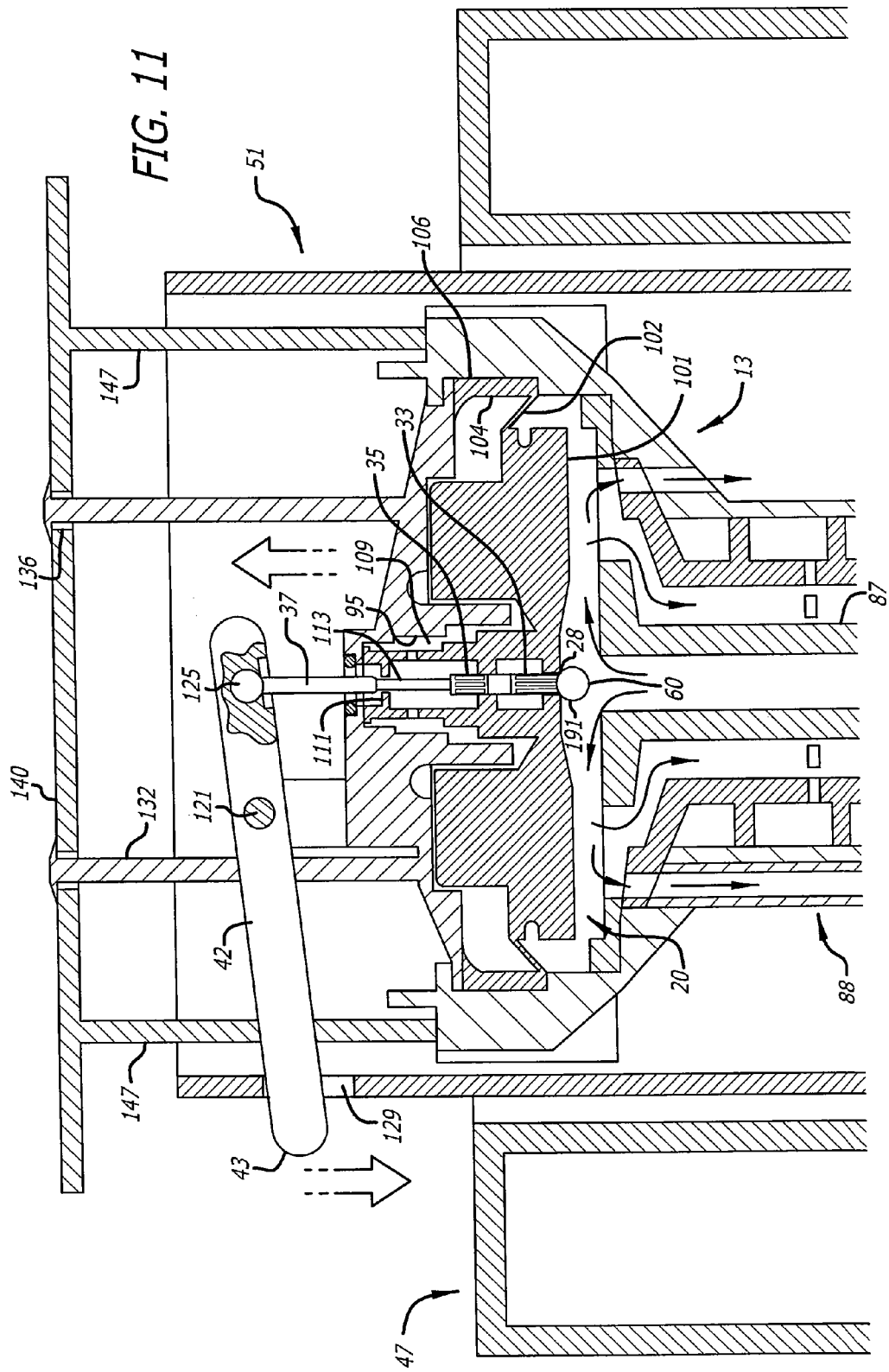
FIG. 11 is vertical, sectional view of a second embodiment of the flow control device shown in FIG. 1.

The embodiment of the present invention shown in FIG. 11 is similar to that shown in FIG. 7 except that the pilot stem 37 is configured at its lower extremity with an enlarged poppet in the form of a spherical poppet 191 configured to seat upwardly on the downwardly facing pilot seat 28.

From the foregoing it will be appreciated that the valve control device of the present invention provides an economical and convenient and effective means for controlling flow of water from an inlet pipe and will provide for a long trouble free life with minimal or no clogging due to residue, scum or the like as might be carried by the water. The catch is operable to positively block the control tube from lowering to open the control valve unless the toilet has been flushed thereby conserving water in the event of a leak and preventing continuous, long term flow through a leak resulting in water damage to the bathroom and underneath rooms.

Although the present invention has been described in detail with regard to the preferred embodiments and drawings thereof, it should be apparent to those of ordinary skill in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention.

I claim:

1. A toilet fluid control apparatus for mounting in a toilet comprising:
    a fluid tank;
    a flush control device mounted to the tank to be actuated to flush fluid from the toilet;
    an upright fill pipe device mounted to the tank;
    a flow control valve mounted on the pipe to control flow of the fluid into the tank;
    a float apparatus coupled with the flow control valve and configured to lower and raise with flow of the fluid out of and into the tank;
    a vertically elongated catch device disposed on one side of the pipe for rotating between catch and release positions;
    a mounting device including an elastomeric hinge for engaging a medial portion of the catch device for mounting the catch device from the pipe for rotation between the catch and release positions;
    a keeper device mounted on the catch device to be, when the catch is in the catch position, disposed in the predetermined path to block lowering of the float apparatus; and
    a connector connecting the catch with the control device to, upon the control device being actuated, rotate the catch device to the release position.

2. A toilet fluid control apparatus comprising:
    a fluid tank;
    a flush control device mounted to the tank to be actuated to flush;
    an upright fill pipe device mounted to the tank;
    a flow control valve mounted on the pipe for controlling flow of fluid into the tank;
    a float apparatus coupled with the flow control valve and configured to lower and raise with the flow of fluid into the tank;
    a vertically elongated catch device disposed on one side of the pipe for rotating between catch and release positions;
    a mounting device for mounting the catch device from the pipe for rotation between the catch and release positions;
    a keeper device mounted on the catch device for, when the catch is in the catch position, being disposed in the predetermined path to block lowering of the float apparatus;
    a friction element engaging the catch device to frictionally hold the keeper device in a selected vertical position on the catch device; and
    a connector connecting the catch device with the control device to, upon the control device being actuated, rotate the catch to the release position.

3. A toilet fluid control apparatus comprising:
    a fluid tank;
    a flush control device mounted to the tank to be actuated to flush the tank and including a control lever arm rotatable to a flush position to flow fluid from the tank;

an upright fill pipe device mounted to the tank and including a lower pipe formed in its upper extremity with an inwardly projecting registration rib and the pipe device further includes an upper pipe telescoped downwardly into the lower pipe and formed with a plurality of ribs spaced therealong to form there between grooves for selective registration with the registration rib to adjust the vertical height of the pipe device;

a fitting to be telescoped over the upper extremity of the lower pipe for selectively compressing the upper extremity radially inwardly and formed in its lower extremity with a downwardly projecting skirt;

a flow control valve mounted on the pipe;

a float apparatus coupled with the flow control valve and configured to lower and raise along a predetermined path with the changing of the fluid level in the tank;

a vertically elongated catch device disposed on one side of the pipe device for rotating between catch and release positions;

a mounting device for mounting the catch device from the pipe for rotation between the catch and release positions and including a ring received over the skirt;

a keeper mounted on the catch device for, when the catch device is in the catch position, being disposed in the predetermined path to block lowering of the float apparatus; and a connector connecting the catch with the control lever arm to, upon the lever arm being rotated to the flush position, rotate the catch device to the release position.

4. The toilet fluid control apparatus of claim 3 wherein:

the catch device includes a linear arm carried medially from the mounting device to project vertically below the mounting device to form a vertical lever arm connected with the control device.

5. The toilet fluid control apparatus of claim 3 wherein:

the float apparatus is cylindrically shaped and is disposed concentrically about the pipe device and is formed with a downwardly facing edge cooperating with the pipe device to form a downwardly opening annulus; and the catch device is configured to project vertically upwardly into the annulus and is further configured so that when the control device is actuated the keeper will be carried radially from beneath the edge toward the pipe device.

6. The toilet fluid control apparatus of claim 3 wherein:

the mounting device includes an adjustment device for mounting the catch device for adjusting the vertical position relative to the pipe device.

7. The toilet fluid control apparatus of claim 3 wherein:

the catch device includes a hairpin shaped spring device formed with co-extensive first and second legs disposed vertically alongside the pipe device;

the mounting device mounts the catch device medially from the pipe device with the first leg projecting there below and attached to the control device; and the keeper is mounted to the catch device for shifting vertically relative to the pipe device.

8. A toilet fluid control apparatus for mounting in a toilet tank and having a flush control device mounted to the tank to be actuated by a flush lever shiftable to a flush position to flush fluid from the tank, an upright fill pipe device including a flow control valve mounted on the pipe device and comprising:

a float apparatus coupled with the flow control valve and configured to lower and raise with the level of the fluid in the tank;

a vertically elongated catch device disposed adjacent the pipe device for rotating between catch and release positions;

a mounting device for mounting the catch device from the pipe for rotation between the catch and release positions and including an elastomeric hinge for engaging the medial portion of the catch;

a keeper device mounted on the catch device to be, when the catch device is in the catch position, disposed in the predetermined path to block lowering of the float apparatus; and a connector connecting the catch device with the flush lever to, upon the flush lever being rotated to the flush position, rotate the catch to the release position.

9. A toilet fluid control apparatus for mounting in a toilet tank and having a flush control device mounted to the tank to be actuated by a flush lever shiftable to a flush position to flush the toilet, an upright fill pipe device including a flow control valve mounted on the pipe device and comprising:

a float apparatus coupled with the flow control valve and configured to lower and raise with the fluid level in the tank;

a vertically elongated catch device disposed exclusively on one side of the pipe device for rotating between catch and release positions;

a mounting device for mounting the catch device from the pipe for rotation between the catch and release positions;

a keeper device mounted on the upper portion of the catch device to be, when the catch is in the catch position, disposed in the predetermined path to block lowering of the float apparatus and including a friction element operating to accommodate shifting of the keeper device longitudinally to selected positions on the catch device; and a connector connecting the lower extremity of the catch device with the flush lever to, upon the flush lever being shifted to the flush position, rotate the catch to the release position.

10. A toilet fluid control apparatus for mounting in a toilet tank and having a flush control device mounted to the tank to be actuated by a flush lever shiftable to a flush position to flush the toilet, an upright fill pipe device including a flow control valve mounted on the pipe and comprising:

a float apparatus coupled with the flow control valve and configured to lower and raise with the fluid level in the tank;

a vertically elongated catch device disposed exclusively on one side of the pipe device for rotating between catch and release positions;

a mounting device including an elastomeric hinge for mounting the catch device from the pipe to project upwardly adjacent the float apparatus for rotation between the catch and release positions;

a keeper device mounted on the upper portion of the catch device to be, when the catch device is in the catch position, disposed in the predetermined path to block lowering of the float device; and a connector connecting the lower extremity of the catch device with the flushable lever to, upon the flush lever being shifted to the flush position, rotate the catch to the release position.

11. A toilet fluid control apparatus for mounting in a toilet tank and having a flush control device mounted to the tank to be actuated by a flush lever shiftable to a flush position to flush the toilet; the apparatus comprising:

an upright fill pipe device including a flow control valve and lower pipe formed in its upper extremity with an inwardly projecting registration rib and pipe device further includes an upper pipe telescoped downwardly into the lower pipe and formed with a plurality of ribs spaced therealong to form there between grooves for selective registration with the registration rib to adjust the vertical height of the pipe device;

the upper extremity of the lower pipe being formed with a plurality of upwardly projecting flexible fingers to allow for expansion and contraction of the registration rib;

a fitting fitted down over the upper extremity and including at least one flange member incorporating through bores for receipt of one or more tubes;

a float apparatus coupled with the flow control valve and configured to lower and raise with the level of fluid in the tank;

a vertically elongated catch device disposed exclusively on one side of the pipe device for rotating between catch and release positions;

a mounting device for mounting the catch device from the pipe for rotation between the catch and release positions;

a keeper device mounted on the catch device to be, when the catch device is in the catch position, disposed in the predetermined path to block lowering of the float apparatus; and a connector connecting the lower extremity of the catch device with the flush lever to, upon the flush lever being shifted to the flush position, rotate the catch device to the release position.

12. The toilet fluid control apparatus of claim 3 that includes:

an actuation tube concentric about the fill pipe device to cooperate therewith in forming an annulus, the actuation tube formed with a downwardly facing edge and coupled with the flow control valve;

an annular float concentric about the actuation tube;

a friction element interposed between the float and actuation tube to provide for adjusting the position of the float on the actuation tube; and the catch device configured to project vertically upwardly into the annulus and further configured so that, when the control device is actuated, the keeper will be carried radially from beneath the edge toward the fill pipe device.

* * * * *